3,026,289
PROCESS OF POLYMERIZING VINYL CHLORIDE OR VINYLIDENE CHLORIDE IN THE PRESENCE OF AN ACRYLAMIDE POLYMER
Harry W. Coover, Jr., Kingsport, Tenn., assignor to Eastman Kodak Company, Rochester, N.Y., a corporation of New Jersey
No Drawing. Filed Nov. 26, 1954, Ser. No. 471,502
4 Claims. (Cl. 260—45.5)

This invention relates to the production of modified polymers of vinyl chloride or vinylidene chloride, and to articles prepared therefrom.

It is known that both vinyl chloride and vinylidene chloride give rise to polymers noted for their high softening temperature and excellent mechanical properties. However, it is also known that polymers of vinyl chloride and vinylidene chloride possess the undesirable property of lacking dye affinity.

Attempts have been made to increase the dyeability of vinyl chloride and vinylidene chloride fibers by interpolymerizing vinyl chloride or vinylidene chloride with certain monomers whose polymers have an affinity for dyes. While this procedure does give polymer products, from which fibers having good dyeing properties can be obtained, a serious drawback frequently occurs, a substantial lowering of the softening point of the fiber being observed.

Other attempts have been made to increase the dyeability of polyvinylidene chloride or polyvinyl chloride fibers by mixing them, before spinning, with other polymeric materials which are dye-susceptible. This procedure, likewise, provides fibers having good dyeing properties, however, many of these fibers show a low softening temperature, and in addition, many show segmentation into their individual components along their horizontal axis. For example, it can be demonstrated that mixtures of polyvinyl acetate and polyvinyl chloride, when dissolved in either N,N-dimethylformamide or N,N-dimethylacetamide in proportions varying from 15 to 50% of polyvinyl acetate, based on the total weight of the mixed polyvinyl acetate and polyvinyl chloride, form grainy dopes which separate into two liquid layers on standing. This is also true of many other polymeric materials, natural or synthetic, which are soluble in the above solvents. Fibers which form from these non-homogenous solutions or mixtures are too low in softening temperature to be of practical value, and are also subject to the defect of segmentation. This is not surprising because of the non-homogeneous condition of the spinning solution and the fact that it is generally known that polyvinyl chloride, or polyvinylidene chloride, is not compatible with many organic substances.

I have now made the unusual and valuable discovery that stable solutions of vinyl chloride or vinylidene chloride polymers, which do not separate into distinct layers on standing, and from which fibers of good dyeability can be spun, can be prepared by polymerizing vinyl chloride or vinylidene chloride (alone or in the presence of another polymerizable monomer) in the presence of certain preformed homopolymers which have not been separated from their polymerization medium and which have an affinity to organic dyes. These fibers are characterized by a softening point higher than that of the interpolymers referred to above and do not exhibit the segmentation defect shown by many of the fibers prepared from certain prior art mixtures comprising polyvinyl chloride or polyvinylidene chloride. Fibers prepared according to my invention also have a softening point higher than fibers prepared from simple interpolymers of vinyl chloride or vinylidene chloride with monomers which have the property of imparting dye affinity to the polymer products. The polymers used for imparting dye affinity to the vinyl chloride or vinylidene chloride polymers of my invention have not been separated from the polymerization mixture prior to the addition of the vinyl chloride or vinylidene chloride, thus distinguishing them from the products obtained in my copending application Serial No. 471,501, filed on even date herewith (now United States Patent No. 2,899,405, dated August 11, 1959). A particular advantage of the invention resides in the fact that the chloride polymers of this invention are non-inflammable, while retaining the other desirable characteristics, when the chloride monomer is employed at concentrations as low as 30% by weight based on the total weight of monomeric material which is polymerized with the preformed unseparated homopolymer. This is of great importance in the manufacture of textile fabrics from polymeric fibers embodying the invention. Another very useful characteristic of the polymers embodying the invention is their increased solubility in many organic solvents as compared to the difficultly soluble polyacrylonitrile polymers. This enhanced solubility is readily achieved at low conversions using batch processes; and, even at conversions of the order of 90% or more, polymers having good solubility in such well known solvents as acetone are readily prepared by continuous processes such as are disclosed in the copending application of Wooten and Shields, Serial No. 471,498, filed concurrently herewith (now United States Patent No. 2,879,256, dated March 24, 1959).

It is, therefore, an object of my invention to provide new and improved vinyl chloride or vinylidene chloride polymer compositions. A further object of my invention is to provide methods of making these modified polymer compositions. Still another object is to provide homogeneous solutions obtained from these polymer compositions comprising vinyl chloride or vinylidene chloride. Another object is to provide fibers from these homogeneous solutions, and methods for making these fibers. Another object is to provide composite unitary polymers which are not inflammable and which have high softening temperatures, excellent mechanical properties, particularly in fiber form, and improved solubility and dyeing characteristics. Other objects will become apparent from a consideration of the following description and examples and the appended claims.

Since my invention relates both to the preparation of polymers of vinyl chloride and vinylidene chloride, for the sake of convenience, these monomers are hereinafter referred to as the chloride monomers. The polymers are similarly referred to.

The preformed homopolymers which are useful in imparting dye affinity to the vinyl chloride or vinylidene chloride polymers of my invention comprise homopolymers of the acrylamides, maleamides, fumaramides, itaconamides, citraconamides, maleamates, fumaramates, itaconamates, citraconamates, acrylates and vinyl esters. The acrylamides have been found especially useful when used according to my invention.

As acrylamides, I can advantageously use in my invention those represented by the following general formula:

I 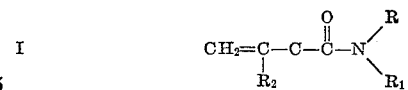

wherein R and $R_1$ each represents a hydrogen atom or an alkyl group containing from 1 to 4 carbon atoms (e.g. methyl, ethyl, propyl, isopropyl, butyl, isobutyl, etc. groups) and $R_2$ represents a hydrogen atom or a methyl group. Typical acrylamides include, for example, acrylamide, N-methylacrylamide, N-ethylacrylamide, N-isopropylacrylamide, N-n-butylacrylamide, N,N-dimethylacrylamide, N,N-diethylacrylamide, methacrylamide, N-methylmethacrylamide, N-ethylmethacrylamide, N-isopropylmethacrylamide, N,N-dimethylmethacrylamide, etc. N-cyclohexyl acrylamides can also be used.

As maleamides, I can advantageously use those represented by the following general formula:

(II) 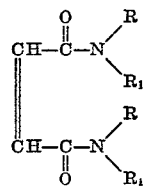

wherein R and R₁ each have the values given above. Typical maleamides include, for example, maleamide, N-methylmaleamide, N-ethylmaleamide, N-propylmaleamide, N-isopropylmaleamide, N-n-butylmaleamide, N,N'-dimethylmaleamide, N,N'-diethylmaleamide, N,N'-di-n-butylmaleamide, N,N'-methylethylmaleamide, N,N'-tetramethylmaleamide, N,N'-tetraethylmaleamide, N,N'-dimethyl-N,N'-diethylmaleamide, etc.

As fumaramides, I can advantageously use those represented by the following general formula:

(III) 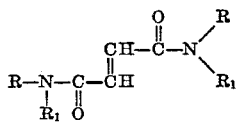

wherein R and R₁ each have the values given above. Typical fumaramides include, for example, fumaramide, N-methylfumaramide, N-ethylfumaramide, N-propylfumaramide, N-isopropylfumaramide, N-n-butylfumaramide, N,N'-dimethylfumaramide, N,N'-diethylfumaramide, N,N'-di-n-butylfumaramide, N-ethyl-N'-methylfumaramide, N-n-butyl-N'-methylfumaramide, N,N'-tetramethylfumaramide, N,N'-tetraethylfumaramide, N,N-diethyl-N',N'-dimethylfumaramide, etc.

As itaconamides, I can advantageously employ those represented by the following general formula:

(IV) 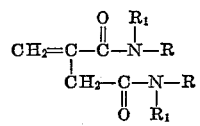

wherein R and R₁ each have the values given above. Typical itaconamides include, for example, itaconamide, N-methylitaconamide, N-ethylitaconamide, N-propylitaconamide, N,N'-dimethylitaconamide, N,N'-diethylitaconamide, etc.

As citraconamides, I can advantageously employ those represented by the following general formula:

(V) 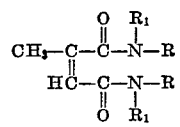

wherein R and R₁ each have the values given above. Typical citraconamides include, for example, citraconamide, N-methylcitraconamide, N-ethylcitraconamide, N-n-butylcitraconamide, N,N'-dimethylcitraconamide, N,N'-diethylcitraconamide, the N,N'-butylcitraconamides, N,N'-tetramethylcitraconamide, etc.

The maleamates useful in practicing my invention comprise those represented by the following general formula:

(VI) 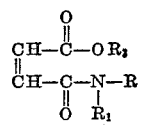

wherein R and R₁ each have the values given above, and R₃ represents an alkyl group of from 1 to 4 carbon atoms (e.g. methyl, ethyl, propyl, isopropyl, n-butyl, iso-butyl, etc.). Typical are methyl maleamate, propyl maleamate, N-methyl methyl maleamate, N-ethyl methyl maleamate, the N-butyl methyl maleamates, the N-methyl butyl maleamates, N-dimethyl methyl maleamate, N-dimethyl ethyl maleamate, N-dimethyl n-butyl maleamate, the N-dibutyl methyl maleamates, etc.

As fumaramates, I can advantageously employ those represented by the following general formula:

(VII) 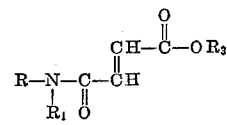

wherein R and R₁, and R₃ each have the values given above. Typical are methyl fumaramate, ethyl fumaramate, propyl fumaramate, n-butyl fumaramate, methyl N-methylfumaramate, ethyl N-methylfumaramate, the butyl N-methylfumaramates, methyl N-dimethylfumaramates, ethyl N-dimethylfumaramate, n-butyl N-dimethylfumaramate, the methyl N-dibutylfumaramates, etc.

As itaconamates, I can advantageously employ those represented by the following general formulas:

(VIII) 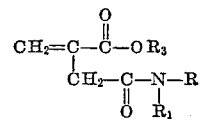

and (VIIIa) 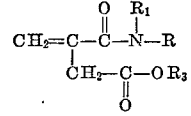

wherein R, R₁, and R₃ each have the values given above. Typical itaconamates include, for example, methyl itaconamate, ethyl itaconamate, propyl itaconamate, the butyl itaconamates, methyl N-methylitaconamate, ethyl N-methylitaconamate, propyl N-methylitaconamate, n-butyl N-methylitaconamate, methyl N-dimethylitaconamate, ethyl N-dimethylitaconamate, n-butyl N-dimethylitaconamate, the methyl N-dibutylitaconamates, etc.

As citraconamates, I can advantageously employ those represented by the following general formulas:

(IX) 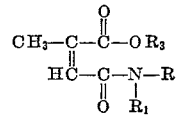

and (IXa) 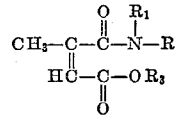

wherein R, R₁, and R₃ each have the values given above. Typical citraconamates include, for example, methyl citraconamate, ethyl citraconamate, propyl citraconamate, the butyl citraconamates, methyl N-methylcitraconamate, ethyl N-methylcitraconamates, propyl N-methylcitraconamates, n-butyl N-methylcitraconamate, methyl N-dimethylcitraconamate, ethyl N-dimethylcitraconamate, n-butyl N-dimethylcitraconamate, the methyl N-dibutylcitraconamates, etc.

As acrylates, I can advantageously employ those represented by the following general formula:

(X) 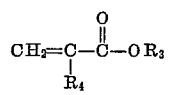

wherein R₃ has the values given above, and R₄ represents a hydrogen atom, a methyl group, or an ethyl group. Typical acrylates include, for example, methyl acrylate, ethyl acrylate, propyl acrylate, isopropyl acrylate, butyl acrylate, methyl methacrylate, ethyl methacrylate, propyl methacrylate, n-butyl methacrylate, isopropyl methacrylate, methyl ethacrylate, ethyl ethacrylate, etc.

As vinyl esters, I can advantageously employ those represented by the following general formula:

(XI)
$$CH_2=CHO-\overset{O}{\underset{\parallel}{C}}-R_3$$

wherein $R_3$ has the values given above. Typical vinyl esters, include, for example, vinyl acetate, vinyl propionate, vinyl butyrate, vinyl isobutyrate, etc.

In practicing my invention, a monomer selected from those represented by Formulas I to XI, inclusive, is first homopolymerized preferably until polymerization is substantially (90–100 percent) complete although lower conversions such as 60–70% or lower are suitably employed with the unpolymerized monomer forming a portion of the monomeric material which is then polymerized with the chloride monomer in the second stage, and without separating the resulting polymer, the chloride monomer (alone or together with one or more polymerizable monomers) is added and polymerization of the resulting mixture of monomer and homopolymer is effected. Alternatively, as mentioned above, the chloride monomer (alone or together with another polymerizable monomer) can be first polymerized and the monomer selected from those represented by Formulas I to XI, inclusive, then polymerized on the chloride polymer which has not been separated from its polymerization medium. In general, the first described method is particularly advantageous.

The polymer compositions of my invention contain from 5 to 95 percent by weight of chloride component (the term chloride component being intended to include both the chloride monomer and any other monomer used therewith) and from 95 to 5 percent of the other monomer component (Formulas I–XI), based on the combined weights of these components. Those compositions containing from about 60 to 95 percent by weight of the chloride component (i.e. chloride monomer or monomers and other ethenoid monomer, if any, polymerized with the homopolymer) have been found useful as fiber-forming materials, and are compatible with polyvinyl chloride or polyvinylidene chloride (depending on chloride component of composition). The fiber-forming polymers embodying the invention can contain anywhere from 30 to 100% by weight of the chloride component as vinyl or vinylidene chloride and up to 70% by weight of another monoethylenic material, and still be noninflammable. Thus fibers formed from these polymers can be woven into textile fabrics which will not sustain combustion in themselves, a characteristic of considerable utility in the textile field and particularly as regards wearing apparel. The compositions containing from 5 to 60% by weight of chloride component can be added directly to polymers containing at least 85% by weight of vinyl chloride or vinylidene chloride units to form compatible mixtures useful for fiber applications, or the compositions can be left in their reaction medium after the polymerization in accordance with this invention has been effected and preferably is substantially (90–100%) complete, and sufficient additional chloride monomer (corresponding to that in the polymer and the reaction medium) can be added to produce a final product containing from 60 to 95% by weight of chloride component and useful in the preparation of fibers of high softening point and ready susceptibility to dyeing by polymerizing such additional monomer in the presence of the "active" product in the polymerization mixture.

The other monoethylenically-unsaturated, polymerizable compound which can undergo polymerization together with the chloride monomer comprises those containing a (XII)      $-CH=C<$ group. Compounds representative of those of Formula XII include those represented by Formulas I to XI above, in addition to such other compounds as styrene, α-methylstyrene, p-acetaminostyrene, α-acetoxystyrene, vinyl chloride (when chloride monomer is vinylidene chloride), vinylidene chloride (when chloride monomer is vinyl chloride), ethyl vinyl ether, isopropyl vinyl ether, isopropenyl methyl ketone, ethyl isopropenyl ketone, methyl vinyl ketone, ethyl vinyl ketone, dimethyl maleate, diethyl maleate, diisopropyl maleate, dimethyl fumarate, diethyl fumarate, diisopropyl fumarate, acrylic acid, 2-vinyl pyridine, 5-vinyl pyridine, 2-methyl-5-vinyl pyridine, methacrylic acid, fumaronitrile, acrylonitrile, methacrylonitrile, N-vinylphthalimide, ethylene, etc. Especially useful polymerizable compounds coming within the scope of Formula XII comprise those containing a (XIIa)      $CH_2=C<$ group. The amount of other monoethylenically-unsaturated, polymerizable compound used with the chloride monomer varies from 0 to 70%, based on the combined weights of the chloride monomer and the other monomer, i.e. the chloride monomer represents the "remaining" 30 to 100% of the monomeric material polymerized with the preformed monomer. A particularly useful combination is one consisting of from 40 to 99 percent of the chloride monomer and from 60 to 1 percent of the other monomer.

The polymerization must be carried out in the presence of a dispersing medium, such as water, mixtures of water with acetone, ethanol, dioxane, etc. By dispersing medium is meant a medium producing a dispersion, i.e. a true solution or a colloidal dispersion.

The polymerization can be accelerated by heat, by actinic light and by the use of a well known polymerization catalyst. Such catalysts are commonly used in the art of polymerization, and my invention is not to be limited to any particular catalyst material. Catalysts which have been found to be especially useful comprise the peroxide polymerization catalysts, such as the organic peroxides (e.g. benzoyl peroxide, acetyl peroxide, acetyl benzoyl peroxide, lauryl peroxide, oleoyl peroxide, triacetone peroxide, urea peroxide, t-butyl hydroperoxide, alkyl percarbonates, etc.), hydrogen peroxide, perborates (e.g. alkali metal perborates, such as those of sodium and potassium, etc.), persulfates (e.g. alkali metal and ammonium persulfates), etc. Other catalysts such as the ketazines, azines, etc. can be used. The quantity of catalyst used can be varied, depending on the monomer, amount of diluent, etc. Generally, from 0.1 to 5% by weight, based on the weight of monomers being polymerized, is sufficient for the purposes of my invention. Sufficient catalyst can be used to homopolymerize the ethenoid monomer selected from those represented by the above general formulas and the chloride monomer, or an amount of catalyst sufficient to polymerize only the ethenoid monomer can be used, and additional catalyst can be added with the chloride monomer to complete the polymerization. The catalyst added along with chloride monomer may be the same catalyst that was used to polymerize the other ethenoid monomer. I have found that it is especially advantageous to use an amount of catalyst sufficient to polymerize only the first monomer, and then upon addition of the chloride monomer to add a further amount of catalyst at that time. This procedure provides a readier means for regulating the molecular weight distribution of the polymer composition.

The temperature at which the process of my invention can be carried out is not critical. Generally, a temperature of from 15° to 75° is sufficient.

If desired, emulsifying agents can be added to the reaction mixture to distribute uniformly the reactants throughout the reaction medium. Typical emulsifying agents include the alkali metal salts of certain alkyl acid sulfates (e.g. sodium lauryl sulfate), alkali metal salts of aromatic sulfonic acids (sodium isobutylnaphthalenesulfonate), alkali metal or amine addition salts of sulfosuccinic acid esters, alkali metal salts of fatty acids containing from 12 to 20 carbon atoms, sulfonated fatty acid amines, alkali metal salts of alkane sulfonic acids, sulfonated ethers, etc.

The polymerization can be carried out in the presence of chain regulators, such as hexyl, octyl, lauryl, dodecyl, myristylmercaptans, etc., which impart improved solubility properties to the polymer compositions. If desired, reducing agents such as alkali metal bisulfites (e.g. potassium, sodium, etc. bisulfites) can be added to reduce the time required for the polymerization to be effected.

The polymerization can be carried out batchwise but is more desirably carried out in continuous fashion. The products formed by continuous processes have a number of advantages. They are more homogeneous and have certain improved properties such as improved solubility over products obtained from analogous batch processes. The continuous processes contemplated herein fall into two main groups: (1) those which are carried out in equipment which permits the continuous addition of reactants and the continuous removal of product (continuous process) and (2) those which are used in batch reactions wherein one or more of the reactants is added continuously during the course of the polymerization, but from which no material is removed during the reaction (continuous batch process). In the preferred process, the chloride monomer alone or with another monomer or monomers containing a regulator such as tertiary dodecyl mercaptan is placed in a suitable storage or supply tank under an atmosphere of nitrogen. In another supply tank, under nitrogen, is charged air-free deionized water containing other reactants including the preformed unseparated homopolymer, the polymerization catalyst, and an acidic reagent such as phosphoric acid for regulating the pH of the reaction mixture. A third tank contains the reducing agent or activator such as potassium metabisulfite in solution in air-free deionized water.

The preferred procedure is to continuously draw the appropriate amounts of solutions or dispersions from the supply vessels into a reactor, subject the mixture to polymerizing conditions and continuously withdraw the graft polymer product from the reactor. By this means, the monomer or monomers are continuously graft polymerized with the preformed polymer at conversions of 70–90% or more of the monomeric material. The length of time between the addition of any increment of reactants to the reactor and the removal of the polymer formed therefrom is defined as the contact time. At equilibrium, the polymer emulsion or slurry is removed from the reactor by suitable means at the same total rate that the ingredients are being added from the supply tanks. Thus, the contact time in the reactor can be conveniently controlled by the absolute rate of addition of the reactants. Usually, the contact time is between 1 and 3 hours, although longer periods are advantageous in some cases. Although the described procedure is preferred, the process can be varied in a number of ways. For example, the ingredients to be added can be combined or separated by using a smaller or larger number of supply tanks, with the practical minimum being two supply tanks, one for the activator and the other for the remaining ingredients. The homopolymer can also be formed continuously and the polymerization mixture containing the unseparated homopolymer continuously fed to the second or graft stage.

The preferred continuous process gives a highly uniform product having excellent solubility characteristics. Thus, for example, graft polymers can be prepared with 15–25% by weight of preformed polymer, such as an acrylamide homopolymer, and 85–75% by weight of monomeric material consisting of 40–60% vinyl or vinylidene chloride and 60–40% acrylonitrile, and such polymers are readily soluble in acetone to give solutions from which textile fibers of high softening temperature, good tensile strength and elongation, good dyeability and non-inflammability can be readily spun by the usual fiber spinning techniques.

Although the continuous process is preferred, a batch or continuous batch process can be employed with good results. In the continuous batch processes, the various ingredients of the polymerization mixture can be added to the reactor in various ways. Thus, the catalyst, activator, homopolymer containing mixture, water, etc. can be charged to the reactor in a batch and the monomeric material and regulator added continuously; the monomeric material, regulator, catalyst, homopolymer mixture, water, etc. can be charged to the reactor and the activator added continuously; the monomer, regulator, activator, homopolymer mixture, water, etc. can be charged to the reactor and the catalyst added continuously; or the monomer, homopolymer mixture, regulator, water, etc. can be charged to the reactor and the catalyst and activator added continuously, either together or separately.

The following examples will serve to illustrate more fully the manner whereby I practice my invention.

*Example 1*

2 g. of N-isopropylacrylamide were added to 100 ml. of water containing 0.5 g. potassium persulfate and 0.5 g. sodium bisulfite and 1 g. of ortho phosphoric acid. Polymerization was completed by heating at 35° C. for 12 hours. 6.4 g. of vinylidene chloride and 1.6 g. vinyl acetate, 0.1 g. potassium persulfate, 0.1 g. sodium bisulfite and 1 ml. of Tergitol No. 4 were added to the cooled reaction mixture and the polymerization completed by heating at 35° C. for an additional 8 hours. The precipitated polymer was obtained in a 90 percent yield and contained 18 percent amide by analysis. The polymer is soluble in such solvents as dimethylacetamide and dimethylformamide. The fibers obtained from this polymer have a softening point above 200° C. and show excellent affinity for dyes.

*Examples 2*

4 g. of N,N-dimethylacrylamide were added to 100 ml. of water containing 0.01 g. of potassium persulfate and 0.01 g. sodium bisulfite. Polymerization was completed by heating at 35° C. for 12 hours. 1 g. of acrylonitrile and 5 g. of vinylidene chloride, 0.1 g. potassium persulfate, 0.1 g. sodium bisulfite and 1 ml. of Tergitol No. 4 were added to the cooled reaction mixture and the polymerization was completed by heating at 35° C. for an additional 8 hours. The resultant polymer is soluble in such solvents as γ-butyrolactone and dimethylacetamide. Fibers obtained from this polymer have a softening point above 190° C. and show excellent affinity for dyes.

*Example 3*

1 g. of N-isopropylacrylamide was added to 100 ml. of water containing 0.05 g. of potassium persulphate and 0.05 g. of sodium bisulfite and 1 g. of orthophosphoric acid. Polymerization was completed by heating at 35° C. for 12 hours. 6.4 g. of acrylonitrile, 1.6 g. vinyl chloride, 0.1 g. potassium persulphate and 0.1 g. sodium bisulfite were added to the cooled reaction mixture and the polymerization completed by heating at 35° C. for an additional 8 hours. The precipitated polymer was obtained in a 90 percent yield and contained 18 percent amide by analysis. The polymer is solvent in such solvents as cyclohexanone and dimethylacetamide. The fibers obtained from this polymer show excellent affinity for dyes.

*Example 4*

4 g. of N,N-dimethylacrylamide were added to 100 ml. of water containing 0.01 g. of potassium persulphate and 0.01 g. of sodium bisulfite. Polymerization was completed by heating at 35° C. for 12 hours. 1.8 g. of acrylonitrile and 4.2 g. of vinyl chloride, 0.1 g. potassium persulphate and 0.1 g. of sodium bisulfite were added to the cooled reaction mixture and the polymerization was completed by heating at 35° C. for an additional 8 hours. The resultant polymer is soluble in such solvents as cyclohexanone, methylethylketone and dimethylformamide. Fibers obtained from this polymer show excellent affinity for dyes.

Example 5

9.7 g. of N,N'-dimethyl fumaramide were suspended in 100 cc. of distilled water along with 0.1 g. of ammonium persulfate, 0.1 g. of sodium bisulfite and 1 g. of a sulfonated ether (Triton 720). The resulting emulsion was allowed to polymerize for 16 hours at 50° C., and then cooled down to room temperature. 0.5 g. of vinyl chloride, 0.01 g. of ammonium persulfate and 0.01 g. of sodium bisulfite were then added and the polymerization completed by tumbling at 50° C. for 8 hours. The emulsion was broken by the addition of a concentrated salt solution and the precipitated polymer was filtered, washed and dried. On analysis the polymer composition was found to contain 94.9 percent by weight of N,N'-dimethyl fumaramide. Fibers obtained from a mechanical mixture containing 30 percent by weight of the polymer obtained and 70 percent by weight of polyvinyl chloride by extruding a solution of the mixture in dimethyl formamide into a precipitating bath had a tenacity of 3.8 g. per denier, an extensibility of 28 percent and a sticking temperature above 165° C.

Example 6

2 g. of N,N'-dimethyl maleamide were suspended in 18 cc. of water along with 0.02 g. of ammonium persulfate, 0.02 g. of sodium bisulfite and 1 g. of a sulfonated ether (Triton 720). The resulting emulsion was allowed to polymerize for 8 hours at 25° C., then cooled down to room temperature and 7 g. of vinyl chloride, 1 g. of vinyl acetate, 0.1 g. of ammonium persulfate, 0.1 g. of sodium bisulfite and 2 g. of a sulfonated ether (Triton 720) in 50 cc. of water were added. After tumbling the reaction mixture at 45° C. for 6 hours, the polymer product was precipitated by the addition of an aqueous solution of sodium chloride to give 9.7 g. of polymer product containing 20 percent by weight of N,N'-dimethyl maleamide. Fibers spun from the above polymer from a solution in dimethyl formamide had a softening temperature above 165° C. and showed excellent affinity for dyes.

Example 7

2 g. of N-methyl methyl fumaramate were emulsified in 50 cc. of water containing 1 g. of a sulfonated ether (Triton 720) and 0.05 g. of ammonium persulfate. The resulting emulsion was heated at 50° C. for 12 hours, cooled to room temperature and a mixture containing 4 g. of vinylidene chloride, 4 g. of acrylonitrile, 0.1 g. of ammonium persulfate and 0.1 g. of sodium bisulfite were added. The reaction mixture was allowed to stand at 25° C. for 12 hours. The precipitated polymer weighed 9.4 g. and contained 19.3 percent by weight of N-methyl methyl fumaramate. Fibers obtained from this polymer had a softening point above 150° C. and showed excellent affinity for dyes.

Example 8

1 g. of N-isopropyl methyl maleamate were emulsified in 10 cc. of water containing 0.5 g. of potassium laurate, 0.01 g. of potassium persulfate and 0.01 g. of sodium bisulfite. The resulting emulsion was heated 12 hours at 35° c. and 16 g. of vinyl chloride, 3 g. of isopropenyl acetate, 0.1 g. of potassium persulfate, 0.1 g. of sodium sulfite and 2 g. of potassium laurate in 100 cc. of water were added and the polymerization was continued for an additional 8 hours at 35° c. The precipitated polymer product was obtained in a 92 percent yield and contained approximately 5 percent by weight of N-isopropyl methyl maleamate. The polymer was soluble in N,N-dimethyl formamide or N,N-dimethyl acetamide. Fibers obtained from these solutions had a sticking temperature above 160° C. and showed excellent dye affinity.

Example 9

8 g. of N-methyl methyl itaconamate were suspended in 80 cc. of water containing 0.1 g. of ammonium persulfate, 0.1 g. of sodium bisulfite and 5 g. of a sulfonated ether (Triton 720). The emulsion was allowed to polymerize for 16 hours at 50° C., at the end of which time polymerization seemed to be complete. The reaction mixture was then cooled and 2 g. of vinylidene chloride, 0.05 g. of ammonium persulfate and 0.05 g. of sodium bisulfite in 30 cc. of water were added. After tumbling the reaction mixture for 4 hours at 50° C., there was obtained 9.7 g. of polymer containing 80.5 percent by weight of N-methyl methyl itaconamate. The polymer can be mixed with polyvinylidene chloride in all proportions and dissolved to give stable solutions which do not separate into distinct layers on standing and from which fibers and films of homogeneous character can be spun, extruded or cast.

Example 10

3 g. of methyl citraconamate, 0.1 g. of ammonium persulfate and 0.1 g. of sodium bisulfite and 1 g. of a sulfonated ether (Triton 720) were added to 50 cc. of distilled water. The resulting emulsion was then heated for 12 hours at 45° C. with tumbling. An emulsion of 15 g. of vinylidene chloride, 2 g. of methacrylonitrile, 0.2 g. of ammonium persulfate and 0.2 g. of sodium bisulfite in 50 cc. of distilled water containing 2 g. of a sulfonated ether (Triton 720) was then added. The reaction mixture was then heated for an additional 8 hours at 35° C. The resulting polymer was obtained in a 93 percent yield and contained 14.9 percent by weight of methyl citraconamate on analysis. Fibers obtained by extruding a solution of the polymer obtained above in N,N-dimethyl formamide had a sticking temperature above 175° C. and showed excellent affinity for dyes.

Example 11

2 g. of N-methyl methacrylamide were dissolved in 80 cc. of water along with 0.2 g. of potassium persulfate and 0.02 g. of sodium bisulfite. The solution was allowed to polymerize for 16 hours at 25° C. There were then added 7.5 g. of vinyl chloride, 0.5 g. of methyl acrylate, 0.1 g. of potassium persulfate and 0.1 g. of sodium bisulfite and the mixture was allowed to polymerize for 8 hours at 35° C. The polymer product was then separated by filtration, yielding 9.3 g. On analysis, the polymers were found to contain 20.5 percent by weight of N-methyl methacrylamide. Fibers obtained from the polymer had a softening point above 145° C. and showed excellent affinity for dyes.

Example 12

2 g. of vinyl acetate were suspended in 18 cc. of water along with 0.02 g. of ammonium persulfate, 0.02 g. of sodium bisulfite and 1 g. of aryloxypolyalkylene sulfonated ether (Triton 720). The resulting emulsion was allowed to polymerize for 16 hours at 50° C., then cooled down to room temperature. 8 g. of vinylidene chloride, 0.1 g. of ammonium persulfate and 0.1 g. of sodium bisulfite and 2 g. of an aryloxypolyalkylene sulfonated ether (Triton 720) in 50 cc. of water were added. After tumbling the reaction mixture at 50° C. for 2 hours, the polymer product was precipitated by the addition of an aqueous solution of sodium chloride to give 9.6 g. of polymer product containing 19.9 percent by weight of vinyl acetate based on analysis. The polymers can be mixed with polyvinylidene chloride in all proportions and dissolved to give stable solutions which do not separate into distinct layers on standing and from which fibers and films of homogeneous character can be spun, extruded or cast.

Example 13

2 g. of citraconamide, 0.05 g. of potassium persulfate and 1 cc. of 7-ethyl-2-methyl undecane-4-sulfonic acid sodium salt (Tergitol No. 4) were added to 30 cc. of water. The resulting emulsion was then tumbled at 50° C. for 12 hours, at the end of which time 8 g. of vinyl chloride, 0.1 g. of potassium persulfate, 2 cc. of 7-ethyl-2-methyl undecane-4-sulfonic acid sodium salt (Tergitol No. 4) and 70 milliliters of water were added. The reaction mixture was then tumbled for an additional 12 hours at 45° C. The resulting polymer was obtained in a 93 percent yield and contained 18 percent by weight of citraconamide on analysis. It was soluble in either N,N-dimethyl formamide or N,N-dimethyl acetamide.

Example 14

3 g. of itaconamide, 0.1 g. of ammonium persulfate, 0.1 g. of sodium bisulfite and 1 g. of an aryloxypolyalkylene sulfonated ether (Triton 720) were added to 50 cc. of distilled water. The resulting emulsion was then heated for 12 hours at 45° C. with tumbling. 15 g. of vinyl chloride, 2 g. of dimethyl fumarate, 0.2 g. of ammonium persulfate, 0.2 g. of sodium bisulfite and 2 g. of an aryloxypolyalkylene sulfonated ether (Triton 720) in 50 cc. of water were then added. The reaction was then heated for an additional 8 hours at 35° C. The resulting polymer was obtained in 89 percent yield and contained 14.8 percent by weight of itaconamide on analysis. Fibers obtained from the polymer had a softening point above 160° C. and showed excellent dye affinity.

Example 15

2 g. of methyl-α-acetamino acrylate were dissolved in 50 cc. of distilled water containing 0.01 g. of ammonium persulfate. The reaction mixture was then heated for 6 hours at 35° C. at the end of which time polymerization was complete. There were then added 7.5 g. of vinylidene chloride, 0.5 g. of vinyl chloride, 0.01 g. of ammonium persulfate and 0.01 g. of sodium bisulfite and 2 cc. of 7-ethyl-2-methyl undecane-4-sulfonic acid sodium salt (Tergitol No. 4). The reaction mixture was then tumbled for an additional 12 hours at 35° C. and the resulting polymer was coagulated by the addition of a sodium chloride solution. The polymer contained 19.8 percent methyl-α-acetamino acrylate on analysis. Fibers obtained from the polymer had a softening temperature above 175° C. and showed excellent dye affinity.

Example 16

3 g. of methyl-α-carboethoxyamino acrylate were dissolved in 70 cc. of water containing 0.05 g. of potassium persulfate and 0.05 g. of sodium bisulfite. The mixture was then held for 8 hours at room temperature, at the end of which time the polymerization appeared to be complete. There were then added 7 g. of vinylidene chloride, 0.1 g. potassium persulfate, 0.1 g. of sodium bisulfite and 2 cc. of 7-ethyl-2-methyl undecane-4-sulfonic acid sodium said (Tergitol No. 4). The emulsion was held for 8 hours at room temperature. The polymer was obtained in a 93 percent yield and contained 30.6 percent methyl-α-carboethoxyamino acrylate on analysis. Fibers obtained from the polymer had a softening point above 165° C. and showed excellent dye affinity.

Example 17

As was indicated, the advantageous properties of the fiber-forming chloride polymers as well as the non-inflammable characteristics are retained with the chloride component containing 30–100% by weight of vinyl or vinylidene chloride and 70–0% of another ethenoid monomer. Thus, 2.5 grams of isopropylacrylamide was added to 100 ml. of water containing 0.5 gram potassium persulfate, 0.5 gram of sodium bisulfite, and 1 gram of orthophosphoric acid. Polymerization was completed by heating at 35° C. for 12 hours. 2.25 grams of vinylidene chloride and 5.25 grams of acrylonitrile, 0.1 gram of potassium persulfate, 0.1 gram of sodium bisulfite, and 1 ml. of Tergitol No. 4 were added to the cooled reaction mixture, and the polymerization was completed by heating at 35° C. for an additional 8 hours. The precipitated polymer was obtained in 90% yield. Fibers obtained from this polymer had a softening point of 200° C., showed an excellent affinity for dyes, and were non-inflammable.

Example 18

The effect on the flammability of the chloride monomer is illustrated by this example wherein the chloride monomer forms only 20% of the chloride component. 2.5 grams of isopropylacrylamide was added to 100 ml. of water containing 0.5 gram potassium persulfate, 0.5 gram of sodium bisulfite, and 1 gram of orthophosphoric acid. Polymerization was completed by heating at 35° C. for 12 hours. 1.5 grams of vinylidene chloride and 6.0 grams of acrylonitrile, 0.1 gram of potassium persulfate, 0.1 gram of sodium bisulfite, and 1 ml. of Tergitol No. 4 were added to the cooled reaction mixture and the polymerization was completed by heating at 35° C. for an additional 8 hours. The precipitated polymer is obtained in 90% yield. Fibers obtained therefrom have a softening point above 200° C., showed excellent affinity for dyes, but were inflammable.

Example 19

2.5 grams of N,N-dimethylacrylamide was added to 100 ml. of water containing 0.01 gram of potassium persulfate and 0.01 gram of sodium bisulfite. Polymerization was completed by heating at 35° C. for 12 hours. 3.0 grams of vinyl chloride and 4.5 grams of methacrylonitrile, 0.1 gram of sodium bisulfite, 0.1 gram of potassium persulfate and 1 ml. of Tergitol No. 4, were added to the cooled reaction mixture, and the polymerization was completed by heating at 35° C. for an additional 8 hours. The resultant precipitated, isolated, and dried polymer was soluble in solvents such as dimethylformamide. Fibers obtained therefrom had a softening point above 190° C., showed excellent affinity for dyes, and were noninflammable.

Similarly improved results are obtained with other polymers prepared in accordance with the invention. The polymers obtained can be compounded with the usual compounding materials if desired such as pigments, dyes, fillers, softeners and the like in accordance with usual practices.

Other solvents which can be used for the preparation of fibers from the new polymers of my invention include ethylene carbonate, ethylene carbamate, γ-butyrolactone, N-methyl-2-pyrrolidone, N,N-dimethylmethoxyacetamide, dimethylcyanamide, N,N-dimethylcyanoacetamide, N,N-dimethyl-β-cyanopropionamide, glycolonitrile (formaldehyde cyanohydrin), malononitrile, ethylenecyanohydrin, dimethylsulfoxide, dimethyl sulfone, tetramethylene sulfone, tetramethylene sulfoxide, N-formylpyrrolidine, N-formylmorpholine, N,N'-tetramethylmethanephosphonamide, etc. Generally speaking, we have found that N,N-dimethylformamide and N,N-dimethylacetamide are particularly advantageous. The amount of polymer dissolved in the solvent can vary from about 10 to 40 percent by weight.

Instead of using an aqueous medium as is disclosed in a number of the above examples, it is possible to use organic solvents, such as acetonitrile, aromatic hydrocarbons, such as benzene, toluene, etc., liquid alkanes, such as n-heptane, etc., aliphatic ethers, acetone, etc. As noted above, organic solvents which are water soluble can be used along with water in the polymerization. The term dispersion as used herein is intended to include both true solutions and emulsions.

The polymers of my invention can also be used in the preparation of sheets, films, tapes, etc. In film form, the polymers can be employed as film base in the manufacture of either black-and-white or color photographic film, wherein the base supports a photosensitive emulsion layer or layers, such as silver halide emulsions.

The invention has been described in detail with particular reference to certain preferred embodiments thereof, but it will be understood that variations and modifications can be effected within the spirit and slope of the invention as described hereinabove and as defined in the appended claims.

This application is a continuation-in-part of my copending application Serial No. 316,063, filed October 21, 1952, and now abandoned.

I claim:

1. The process which comprises graft copolymerizing at a temperature of 15°–75° C. in water and in the presence of a proxy polymerization catalyst a mixture consisting of (1) 5–40% by weight of an unisolated homopolymer of a material (I) of the formula

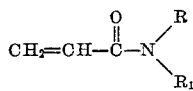

wherein R and $R_1$ are members of the group consisting of hydrogen and alkyl groups of 1–4 carbon atoms, and (2) 95–60% by weight of monomeric material (II) composed of 30–99% by weight of a member of the group consisting of vinyl chloride and vinylidene chloride and 70–1% by weight of a member of the group consisting of acrylonitrile, vinyl acetate, methyl acrylate and methacrylonitrile.

2. The process which comprises graft copolymerizing at a temperature of 15°–75° C. in water and in the presence of a peroxy polymerization catalyst a mixture consisting of (1) 15–25% by weight of an unisolated homopolymer of an N-alkyl amide of acrylic acid in which the alkyl group contains 1–4 carbon atoms and (2) 85–75% by weight of monomeric material composed of 40–60% by weight of vinylidene chloride and 60–40% by weight of acrylonitrile.

3. The process according to claim 1 wherein the material (I) is N-isopropylacrylamide.

4. The process according to claim 1 wherein the material (I) is N,N'-dimethyl acrylamide.

References Cited in the file of this patent

UNITED STATES PATENTS

| | | |
|---|---|---|
| 2,614,089 | Harrison | Oct. 14, 1952 |
| 2,649,434 | Coover et al. | Aug. 18, 1953 |
| 2,666,025 | Nozaki | Jan. 12, 1954 |
| 2,666,042 | Nozaki | Jan. 12, 1954 |

FOREIGN PATENTS

| | | |
|---|---|---|
| 627,265 | Great Britain | Aug. 4, 1949 |

OTHER REFERENCES

Smets et al.: "Jour. Polymer Science," volume 8, pages 289–311, March 1952.

Wakeman: "The Chemistry of Commercial Plastics," page 403, Reinhold Pub. Corp., New York (1947).